Jan. 24, 1939.                M. COHN                2,144,911

APPARATUS FOR THE MANUFACTURING OF FLAKES

Filed July 24, 1936

Inventor:
Martin Cohn
By Sommers & Young
Attys

Patented Jan. 24, 1939

2,144,911

UNITED STATES PATENT OFFICE 2,144,911

APPARATUS FOR THE MANUFACTURING OF FLAKES

Martin Cohn, Berlin-Friedenau, Germany

Application July 24, 1936, Serial No. 92,454
In Germany September 22, 1933

2 Claims. (Cl. 99—234)

This invention relates to an apparatus for flaking fruit and seeds of any kind. Such materials containing nutritious substances are changed in one passage through the apparatus according to the invention into thin skinlike leafy small parts. Formerly seeds could only be flattened by cylinders. In so doing the structure of the individual grains remained essentially intact. It was impossible to effect the flattening and drying at the same time because the heat could not reach the core of the flattened material in the short time of the material's passage through the apparatus. For the production of thin skinlike flakes the material was first comminuted and reduced to a homogenous paste. This paste was then spread on rotating hot cylinders and changed into a connecting film. The film was taken off the cylinders and dried.

The apparatus according to the present invention serves for the production of thin skinlike flakes from fruit and seeds. The apparatus consists of two heated parallel coacting smooth cylinders and a stamping device which acts into the gap of the cylinders.

The goods are brought to the apparatus in a state as they are found, that is without any comminution, or in coarse form after being soaked or swelled.

The stamping device ensures the regular admission of the materials to between the cylinders and uniform distribution. In connection with the stamping device the smooth cylinders perform the uniform uninterrupted crushing of the whole or coarse material soaked with fluid into thin films, which are immediately dried to the desired degree on the cylinders during their passing to the scrapers.

This quick and complete drying during the change of the goods into the thin skinlike film is obtained, because of the fact that the whole or coarse material will have taken up only a limited amount of liquid during the soaking or swelling, which furthermore is optimal for the gripping of the material by the smooth cylinders.

Each fruit and each seed and all fruit and seeds containing oil or fat can be worked with the new apparatus in a single working into a flaked material ready for use or storing.

This is important for the working of grains, and also for the working of oil and fat containing fruits and seeds as soya beans, earth nuts, copra, cotton seeds, palm kernels, sesame, walnuts, hazelnuts and so on. Such materials can be worked immediately into human or animal food ready for use without requiring special comminuting and grinding devices for a pretreatment and special drying devices for an aftertreatment, which was necessary until now.

It is also an advantage of the new apparatus that by its use goods are saved from damage of the nutritious substances contained. Whilst the material is on the cylinders, vapor comes from the material and suppresses the generation of injurious superheating. The crushing of the material and the formation of the films, and also the drying generally takes place in a fraction of a minute, so that, in consequence of this very short time, practically no decomposing reactions take place and all nutritious substances remain practically unchanged.

In the annexed drawing an example of the apparatus is shown.

Figure 1:
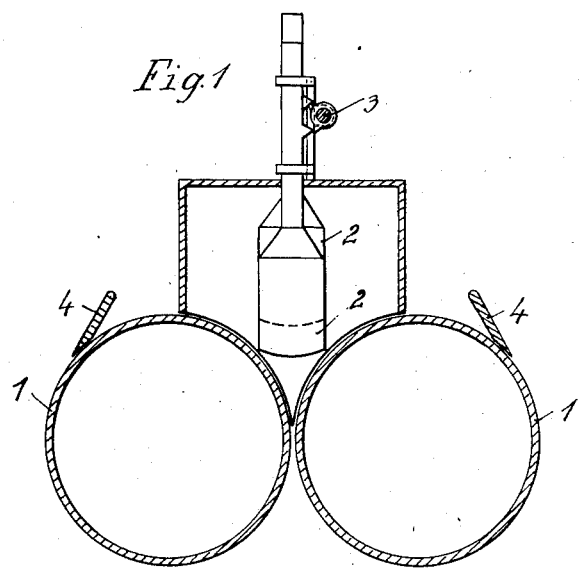
Fig. 1 shows the apparatus in cross section.
Figure 2:
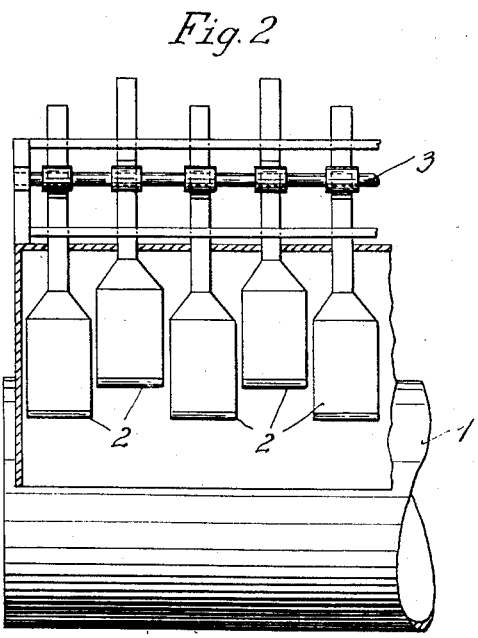
Fig. 2 shows a part of the same apparatus in central section.

Above the gap of the heated, coacting, adjustably arranged, smooth cylinders 1 the stampers or rams 2 are positioned, and these stampers are all actuated by a cam shaft 3. The material which is changed into thin skinlike film and is dried, is scraped off by knives 4.

The stamping device may comprise, a single stamper or more stampers actuated simultaneously and may at the same time comprise cutting means.

The use of the apparatus is as follows:

The fruit or seeds are soaked or swelled and brought in the whole state to the flaking apparatus.

Seeds such as soya beans, which need an improving treatment are advantageously subjected to a wet improving-treatment while whole and then brought to the flaking apparatus. The heated cylinders of the apparatus are so adjusted that the material is crushed and pressed into a thin skinlike film. The speed of rotary of movement of the cylinders is so regulated that the material has the desired dryness when it gets to the scraping knives.

It is especially important, that by means of the new apparatus, oil or fat containing material may be worked without difficulty. Heretofore such material could not be worked at all into thin leafy goods.

In my copending patent application Serial No. 744,452, filed September 17, 1934, of which the present application is a continuation-in-part, I have claimed the process performed according to the invention, and the product thereof.

I claim:

1. Comminuting and drying apparatus for flaking swelled coarse material into dry skin-like films comprising, two heated parallel slightly spaced, coacting smooth cylinders; a stamping mechanism, having ramming means which falls down periodically into the space between the cylinders approaching both of said cylinders simultaneously and scrapers which scrape the material off the cylinders.

2. Comminuting and drying apparatus for flaking swelled coarse material into dry skin-like films comprising, two heated parallel, coacting smooth cylinders; a plurality of stamps arranged adjacent each other and acting into the space between said cylinders; a cam shaft for actuating said stamps; and scrapers for scraping the material off the cylinders.

MARTIN COHN.